2 Sheets—Sheet 1.
R. J. POND.
Horse-Detacher.
No. 209,834. Patented Nov. 12, 1878.
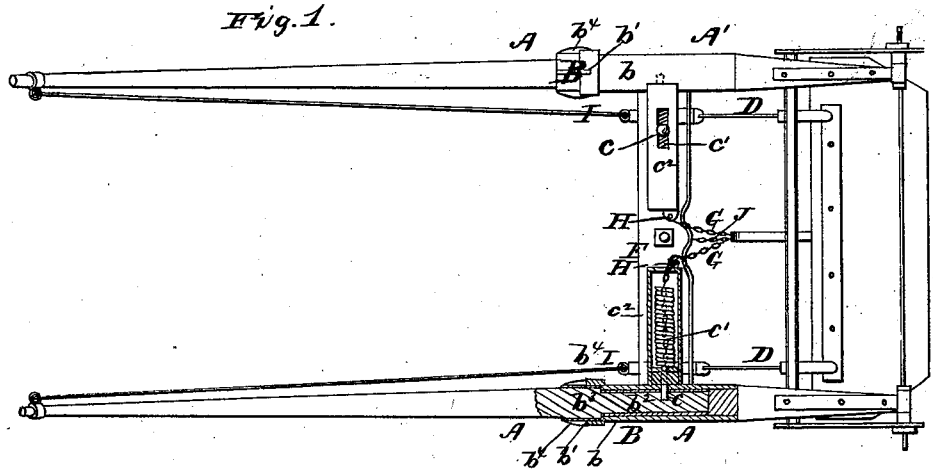
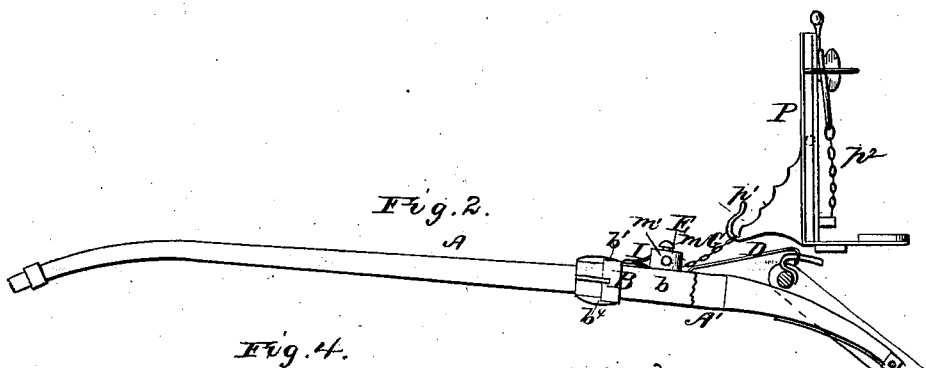
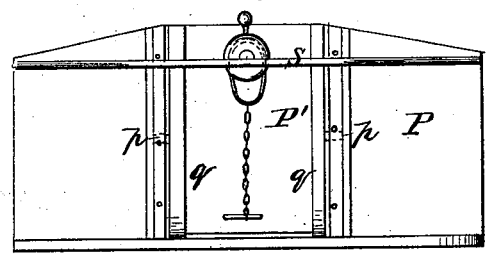
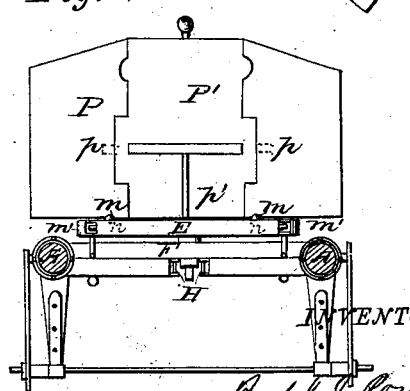
WITNESSES
Wm Blackstock
M. Church
INVENTOR
Robt. J. Pond
Wm Hill & Ellsworth
his Attorneys 2 Sheets—Sheet 2.
R. J. POND.
Horse-Detacher.
No. 209,834. Patented Nov. 12, 1878.
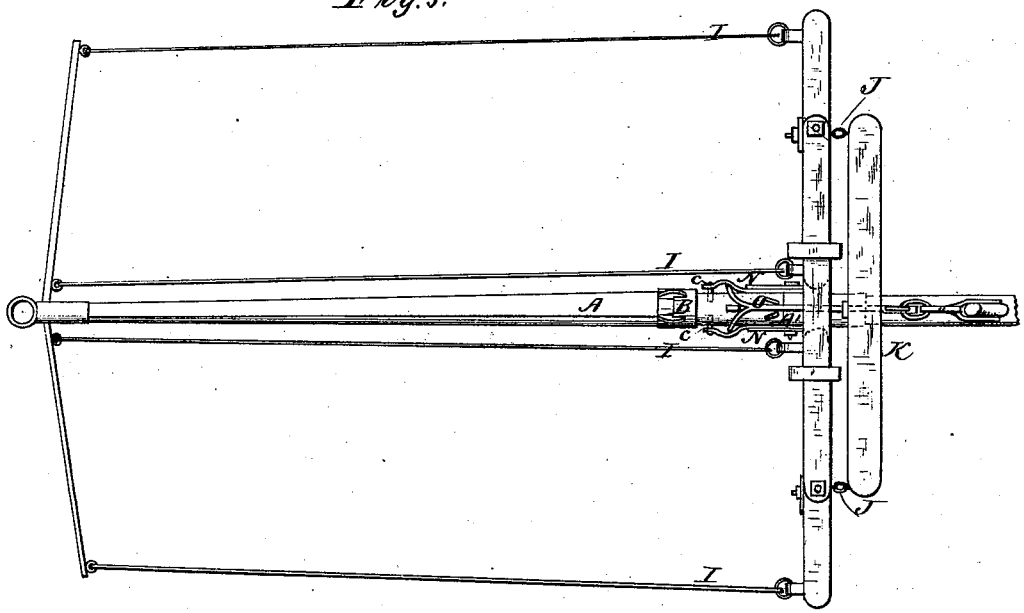
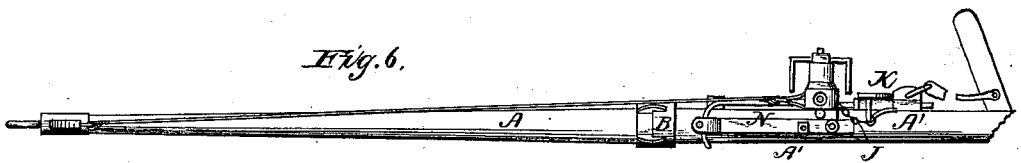
WITNESSES
INVENTOR
ATTORNEYS

UNITED STATES PATENT OFFICE.

ROBERT J. POND, OF NEW YORK, N. Y.

IMPROVEMENT IN HORSE-DETACHERS.

Specification forming part of Letters Patent No. 209,834, dated November 12, 1878; application filed April 18, 1878.

*To all whom it may concern:*

Be it known that I, ROBERT J. POND, of New York, in the county of New York and State of New York, have invented a certain new and Improved Apparatus for Detaching Horses from Vehicles; and I do hereby declare the following to be a full and exact description of the same, reference being had to the accompanying drawings, forming part of this specification, in which—

Figure 1 is a bottom-plan view, partly in section; Fig. 2, a side elevation; Fig. 3, a front elevation, with the thills in section; and Fig. 4, a rear elevation of the dash-board; Figs. 5 and 6 are respectively a top-plan and a side elevation of a modification of my invention, showing its application to pole-vehicles.

Like letters of reference indicate the same parts in the several figures.

The object of this invention is to provide for all kinds of vehicles drawn by animal power a simple and effective apparatus by which, in case of runaway, the animal can be readily and with safety, both to it and the carriage, detached and liberated; and the invention consists in the various devices and combinations for effecting these results, all which I will now proceed to describe in detail.

All or any of the parts composing the thills or pole, the whiffletree, and their attachments and connections may be constructed, in whole or in part, of metal, wood, hard rubber, gutta-percha, papier-maché, or other suitable material, the material forming no part of the invention herein claimed.

In the drawings, each thill or pole is shown as formed in two sections, A A', connected together by a socket-joint, B, and locked by a sliding pin, $c$. The tubular socket-piece $b$ has its end enlarged and slotted, as shown at $b^1$, and the end of the connecting section has a cylindrical portion, $b^2$, fitting into the smaller part of the socket, and an enlargement, $b^3$, fitting into the enlarged part of the socket, and provided with ribs $b^4$, which enter the slots of the socket-piece, for the purpose of guiding the parts properly to enable them to lock together, and also of holding the shafts or pole steadily, so that they will not turn. When the part $b^2$ is slid into the socket $b$, and the pin $c$ is inserted through the wall or walls of the part $b$ into or through the part $b^2$, the thills or pole will be firmly locked together, and when the pin is withdrawn the forward portion A of the thill or pole will slide forward by the power of the team and become detached from the part A', leaving the latter permanently connected to the carriage. Lifts or supports D prevent the part A' from dropping to the ground and tripping the carriage.

In rear of the tubular socket-joint I arrange the whiffletree E (or whiffletrees, if the team is double) and the bar F, by which they are supported. In one-horse carriages the pin $c$ will slide in sockets beneath the bar F, which latter is made concave to receive it and its connections. The connections consist of a spring, $c^1$, to hold it normally engaged with the part $b^2$ and any suitable guides $c^2$ to prevent it from turning and to limit its movement. Chains or wires G, or their equivalents, are attached to the inner end of the sliding rods or pins $c$, or their connections, and are arranged to pass around a friction-pulley, H, or its equivalent, and extend rearward to within reach of the driver, so that by drawing back on said chains the pins $c$ can be retracted from the parts $b^2$ and the two sections A A' disconnected from each other. In thill-carriages this arrangement is provided for each thill, and the two chains G may be connected together, or to a single chain or rod extending back to the driver's control. A similar arrangement is also provided within the whiffletree at each end, for the purpose of detaching the tugs or traces I by drawing back a chain, or its equivalent, J.

The sliding pins $m$ in the whiffletree, which correspond in function to the pins $c$, project into or through a socket or slot, $m'$, which receives the tug or iron hook, and serves to lock and hold the traces or tugs until it is withdrawn by some force acting upon the chain J, and overcoming the resistance of the springs $n$ within the whiffletree. The chains G and J may be connected, and are designed to be connected together, or else connected to the same lever or other appliance for operating them, so that a single movement of the driver or passenger will simultaneously unlock and disconnect the thill-sections and unlock and liberate the traces, thus instantaneously detaching the draft animal from the carriage.

In pole-carriages the pins $c$ may be supported upon flat springs N, fastened inside or outside of the rear section of the pole; and the spring or springs may be opened outward by means of a sliding hooked lever, O, or equivalent, which, when drawn back, spreads the leaves of the springs apart, or moves it or them outward, so as to withdraw the pins and detach the forward section of the pole. In such pole attachments the two chains J of the two whiffletrees are to be connected to a bar, K, which operates them both by one movement, being itself operated by a chain or rod extending back to within reach of the driver.

Any suitable lever or power attachment may be employed to facilitate the retraction of the operating chains or rods above described, and it may be arranged to be operated by the hand or foot, and either by the driver or by the passenger within the carriage, or by both. When the driver is to operate it I prefer to construct the dash-board P with a pivoted section, P', which swings on pivots $p\ p$, and is connected with the retracting-chain by means of a hook, or equivalent, $p^1$, below the line of the pivots $p$, so that by pressing the foot against the upper edge of such section P' the latter will swing on its pivot and retract the chain or chains. A chain and ring, $p^2$, may also be attached to the lower edge of the movable section P', by which the latter can be operated by hand, if preferred. The section may be provided with springs $q$, attached to it and bearing against the fixed part of the dash-board or other part of the carriage, or attached to the latter and bearing against the movable section, for the purpose of holding the latter normally in position. The movable section may also, if preferred, be provided with a sliding bolt, or any equivalent device, whereby it can be fastened securely, so as not to be accidentally or unintentionally operated.

The section need not extend to the top of the dash-board. A bar or fender, S, (one or more,) may be arranged across in front of it, or above it from one side of the dash-board to the other, against which the driver may brace his foot, when necessary, without danger of detaching the team.

This apparatus, whether applied to thill or pole carriages, is, it will be observed, quite simple, and is very neat in appearance, giving really a handsomer finish to the vehicle than as heretofore constructed. It differs in principle from all other devices of the kind heretofore attempted in this, that the whiffletree and so much of the thills or pole as is necessary to its support are not here detachable, but only the traces and that portion of the thills and pole lying forward of the whiffletree.

With my improvement, therefore, there is nothing to drag behind or under the animal's feet when he is detached, and thereby frighten him into frenzy; but his feet and legs are entirely unobstructed, the harness, if properly constructed, serving to hold the short thill or pole sections A up from the ground in, or nearly in, their normal position.

Having thus described my invention, I claim as new—

1. The shafts A A', made in two parts, separable forward of the whiffletree, in combination with the cross-bar F, inclosed guiding-sockets $c^2$, attached to the bar and containing the longitudinally-sliding bolts $c$ and springs $c^1$, and with the two chains G G and lever P', substantially as described.

2. The dash-board P, constructed with the lever-section P', connected to the apparatus for unlocking the traces and thills, substantially as described.

3. The dash-board P and lever section P', combined with springs for the purpose of holding the section P' normally in position as a part of the dash-board, substantially as described.

ROBT. J. POND.

Witnesses:
KOERT DU BOIS,
THOMAS LESTER.